(12) United States Patent
Bordin

(10) Patent No.: US 11,952,785 B2
(45) Date of Patent: Apr. 9, 2024

(54) COVERING FOR UNDERLAYS OF FLOORING

(71) Applicant: PROGRESS PROFILES SPA, Asolo (IT)

(72) Inventor: Dennis Bordin, Asolo (IT)

(73) Assignee: PROGRESS PROFILES SPA, Asolo (IT)

( * ) Notice: Subject to any disclaimer, the term of this patent is extended or adjusted under 35 U.S.C. 154(b) by 0 days.

(21) Appl. No.: 17/056,921

(22) PCT Filed: Apr. 30, 2019

(86) PCT No.: PCT/EP2019/061023
§ 371 (c)(1),
(2) Date: Nov. 19, 2020

(87) PCT Pub. No.: WO2019/228734
PCT Pub. Date: Dec. 5, 2019

(65) Prior Publication Data
US 2021/0207386 A1    Jul. 8, 2021

(30) Foreign Application Priority Data

May 31, 2018  (IT) .................. 102018000005884

(51) Int. Cl.
*E04F 15/18* (2006.01)
*B32B 3/30* (2006.01)
(Continued)

(52) U.S. Cl.
CPC .............. *E04F 15/185* (2013.01); *B32B 3/30* (2013.01); *B32B 5/02* (2013.01); *B32B 5/26* (2013.01);
(Continued)

(58) Field of Classification Search
CPC ........ E04F 15/185; E04F 15/186; B32B 3/30; B32B 5/02; B32B 5/26; B32B 27/12;
(Continued)

(56) References Cited

U.S. PATENT DOCUMENTS 4,751,122 A * 6/1988 May .................. E04B 1/665
428/192
9,518,746 B2  12/2016 Larson
(Continued)

FOREIGN PATENT DOCUMENTS

CA    2555606 A1    2/2007
CN    1869376 A     11/2006
(Continued)

OTHER PUBLICATIONS

International Search Report dated May 28, 2019 re: Application No. PCT/EP2019/061023, pp. 1-4.
(Continued)

*Primary Examiner* — Michael Zhang
(74) *Attorney, Agent, or Firm* — CANTOR COLBURN LLP

(57) ABSTRACT

A covering for underlays of flooring includes
a membrane with a base from which studs extend which protrude upward with respect to the laying plane,
a draining layer which is joined in an upper region to the membrane at the top of the studs,
and a layer for anchoring to the underlay of the flooring, joined in a lower region to the membrane at least at the base.

9 Claims, 3 Drawing Sheets

(51) Int. Cl.
*B32B 5/02* (2006.01)
*B32B 5/26* (2006.01)
*B32B 27/12* (2006.01)

(52) U.S. Cl.
CPC ............ *B32B 27/12* (2013.01); *E04F 15/186* (2013.01); *B32B 2250/03* (2013.01); *B32B 2262/0253* (2013.01); *B32B 2307/31* (2013.01); *B32B 2307/726* (2013.01); *B32B 2471/00* (2013.01)

(58) Field of Classification Search
CPC ........ B32B 2250/00; B32B 2262/0253; B32B 2307/31; B32B 2307/726; B32B 2471/00
See application file for complete search history.

(56) References Cited

U.S. PATENT DOCUMENTS

| | | | |
|---|---|---|---|
| 2004/0018354 A1 | 1/2004 | May | |
| 2006/0260233 A1* | 11/2006 | Schluter | E04F 15/18 52/302.3 |
| 2008/0127593 A1 | 6/2008 | Janesky | |
| 2010/0196658 A1* | 8/2010 | Weller | E04F 13/142 428/134 |
| 2011/0011515 A1* | 1/2011 | Blasdel | E02D 31/025 428/346 |
| 2011/0173923 A1* | 7/2011 | Kuepfer | E04F 21/165 428/159 |
| 2011/0232217 A1* | 9/2011 | Hartl | E04F 15/18 52/309.1 |
| 2013/0084419 A1* | 4/2013 | Taylor | B32B 3/02 428/190 |
| 2014/0202099 A1* | 7/2014 | Boyle | E04F 15/02044 52/747.11 |
| 2015/0167321 A1 | 6/2015 | Schluter | |
| 2017/0114551 A1* | 4/2017 | Sennik | E04F 15/186 |

FOREIGN PATENT DOCUMENTS

| | | |
|---|---|---|
| CN | 1936187 A | 3/2007 |
| DE | 19649372 A1 | 6/1998 |
| DE | 102014211743 A1 | 12/2015 |
| EP | 2372041 A2 | 10/2011 |
| GB | 2404204 A | 1/2005 |
| JP | 2008214934 A | 9/2008 |
| WO | 2015168782 A1 | 11/2015 |
| WO | 2015168785 A1 | 11/2015 |
| WO | 2017106860 A1 | 6/2017 |

OTHER PUBLICATIONS

IT Search Report dated Jan. 15, 2019 re: Application No. IT 201800005884, pp. 1-9.
Written Opinion dated May 28, 2019 re: Application No. PCT/EP2019/061023, pp. 1-7.
CN Office Action dated Sep. 24, 2021 re: Application No. 2019800350203, pp. 1-17.
IN Office Action dated Mar. 21, 2022 re: Application No. 202037053173, pp. 1-5.
Japanese Office Action for Japanese Application No. 2021-517113, dated Feb. 28, 2023, 10 pages with translation.
Korean Office Action for Korean Application No. 10-2020-7037459, dated Feb. 20, 2023, 13 pages with translation.
Israel Office Action for Application No. 279085, dated Nov. 13, 2023, 3 pages.

* cited by examiner

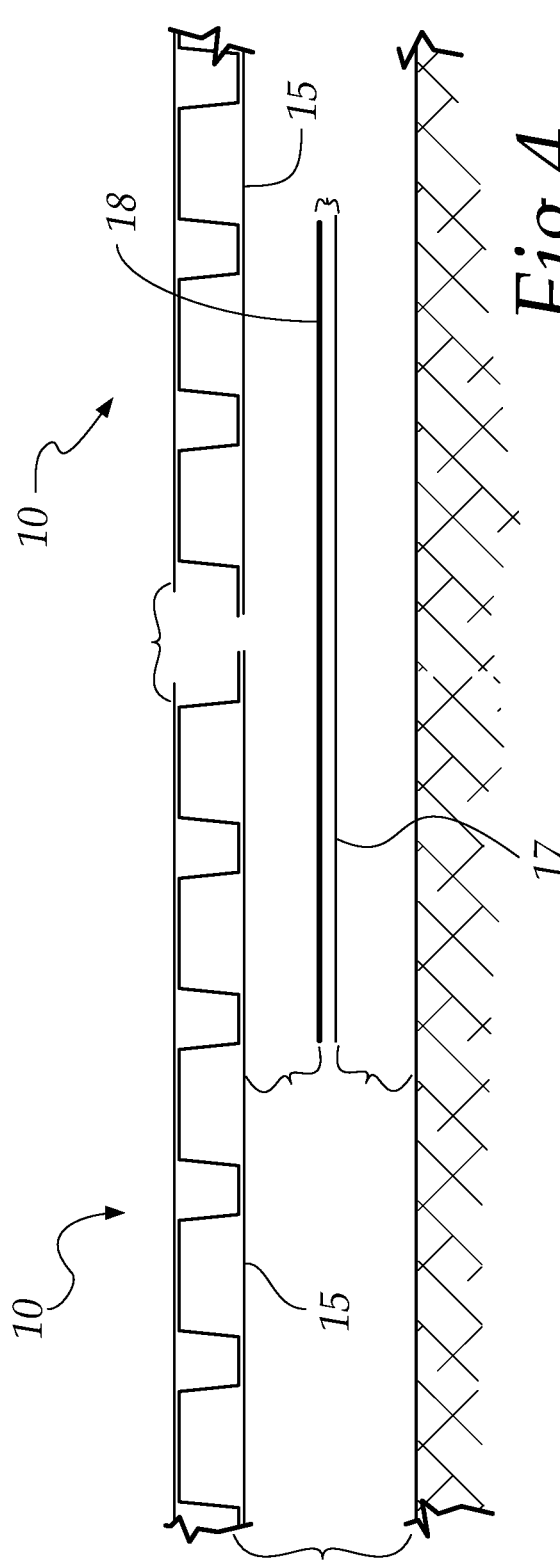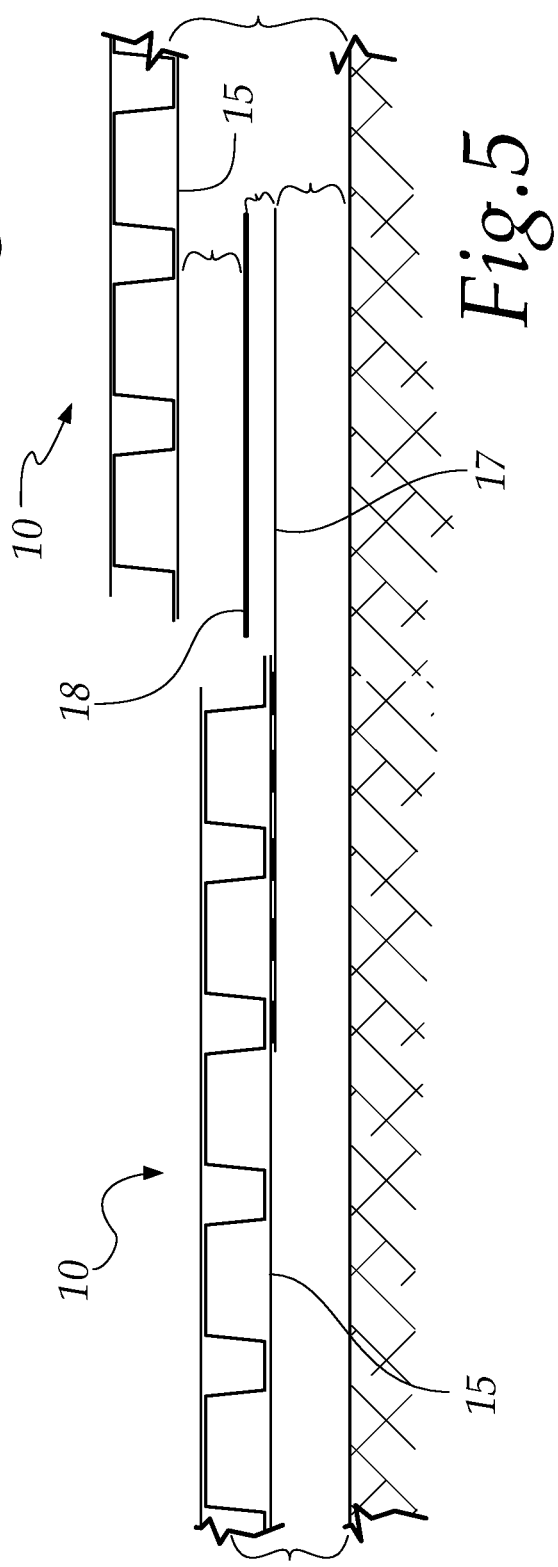

COVERING FOR UNDERLAYS OF FLOORING

TECHNICAL FIELD

The present disclosure relates to a covering for underlays of flooring.

BACKGROUND

In the building industry, aesthetic trends lead to the use of increasingly larger ceramic tiles, even larger than the 60 cm×60 cm format.

Accordingly, chemical products for gluing such tiles and integrated systems, such as high-performance cement-based adhesives with additives to obtain a greater elasticity, adapted to facilitate correct laying even of large tile formats, are becoming widespread.

Among these, it is known to use adhesives in the lower and central part of the tile. Following the laying of the tile, during the curing phase of these adhesives, the excess water of the mixture must be able to evacuate.

However, the significant dimensions of the tiles described above hinder the flow of the water to the gaps, from which it should have the possibility to exit, leaving a humid environment in the underlay of the flooring. Because of this prolonged retention of water, part of the components of the chemical formula of the mix used in the laying of the tiles does not bond and does not react appropriately.

These components are thus free to migrate through the pores of the adhesive, leaking through the grouting, resulting in phenomena with unpleasant aesthetic effects, such as efflorescence.

SUMMARY

The aim of the present disclosure is to provide a covering for underlays of under-flooring that is capable of improving the background art in one or more of the above mentioned aspects.

Within this aim, the disclosure allows perfect curing and drying of the adhesive present on the lower face of the tiles.

The disclosure avoids the occurrence of unsightly effects.

Moreover, the present disclosure overcomes the drawbacks of the background art in a manner that is alternative to any existing solutions.

The disclosure further obtains a continuous waterproofing of the underlay.

The disclosure also provides a covering that is highly reliable, relatively easy to provide and at competitive costs.

This aim and these and other advantages that will become better apparent hereinafter are achieved by providing a covering for underlays of flooring, characterized in that it comprises:
- a membrane with a base from which studs extend which protrude upward with respect to the laying plane,
- a draining layer, which is joined in an upper region to said membrane at the top of said studs,
- a layer for anchoring to the underlay of the flooring, joined in a lower region to said membrane at least at said base.

BRIEF DESCRIPTION OF THE DRAWINGS

Further characteristics and advantages of the disclosure will become better apparent from the description of a preferred but not exclusive embodiment of the covering according to the disclosure, illustrated by way of non-limiting example in the accompanying drawings, wherein:

FIG. 4 is a side view of the joining of two adjacent coverings; and

FIG. 5 is a side view of the joining of two adjacent coverings.

DETAILED DESCRIPTION OF THE DRAWINGS

Figure 1:
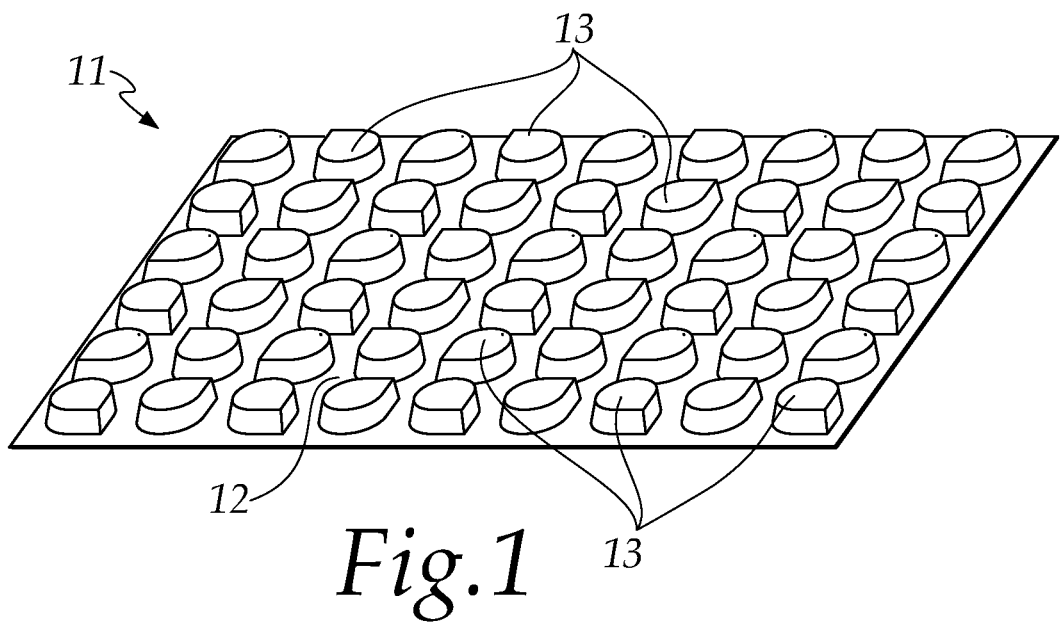
FIG. 1 is a perspective view of a membrane of the covering according to the disclosure.

With reference to the above cited figures, the covering according to the disclosure, generally designated by the reference numeral 10, is adapted to be laid over a slab, or on a flooring suitable for a ceramic or natural stone covering, and to receive the tiles in an upper region.

The covering 10 comprises:
- a membrane 11 with a base 12 from which studs 13 extend which protrude upward with respect to the laying plane,
- a draining layer 14, which is joined in an upper region to the membrane 11 at the top of the studs 13,
- a layer 15 for anchoring to the underlay of the flooring, joined in a lower region to the membrane 11 at least at the base 12.

FIG. 1 shows the membrane 11. It is made of plastic material, preferably polyethylene or polypropylene, or other polymeric plastic material or, also, other material suitable for thermoforming or molding.

In the illustrated case, the studs 13 have a plan shape mainly with a circular external profile.

In other embodiments, not shown in the figures, the plan shape can be different: for example, square, triangular or shaped like another regular or irregular polygon.

The studs 13 are substantially frustum-like, having a reduction in cross-section away from the base 12, are hollow inside, and are obtained by thermoforming.

In different embodiments, not shown in the figures, the studs 13 may have a frustum-like shape with an inverted extension with respect to the one described above and shown in the figures. In this case the reduction in cross-section occurs near the base 12.

In other embodiments, not shown in the figures, the studs 13 have a shape other than the frustum-like one, which can be regular or not.

Approximating the studs 13 to a circular shape, the dimensions of the diameter can vary, preferably, from 1 mm to 50 mm. The height of the studs 13 and their mutual distance also can vary, preferably, from 1 mm to 50 mm. Depending on these dimensions, the number of studs, in a 100-m$^2$ membrane, can vary from a minimum of 100, with a stud diameter of 50 mm and a distance of 50 mm between one stud and the other, to a maximum of 250,000, with a stud diameter of 1 mm and a distance of 1 mm.

A preferable example of membrane 11 can have the following characteristics: studs with a height between 3 and 5 mm, diameter comprised between 8 and 12 mm at the base and diameter between 7 and 11 mm at the top, distance between the tops of the studs between 4 and 6 mm and center distance comprised between 12 and 16 mm. With these dimensions, the membrane has a distribution of studs comprised between 5000 and 5300 for each square meter and each raised portion has a surface of about 63 mm$^2$. Therefore, the membrane has an upper supporting surface of 0.32 m², i.e., 32% of the total surface.

The draining layer 14 is positioned on the top of the studs 13 and is preferably constituted by a geotextile material, adapted to allow the passage of water and vapor, therefore adapted to allow the elimination of humidity, with consequent correct curing of the adhesive.

The geotextile material is preferably made of NWF, but as an alternative it may be constituted by draining fabric or other material suitable for the passage of water and vapor.

The draining layer 14 is advantageously heat-sealed to the top of the studs 13, in order to avoid separations that can occur with the use of adhesives, owing to loss of bonding or to aging of the adhesives.

As an alternative, the draining layer 14 can be glued, by means of an appropriate and strong adhesive (selected for example from heat-reactive adhesives, two-part epoxy adhesives, bituminous adhesives or others that are capable of gripping the material), to the membrane 11.

The anchoring layer 15 is joined below the membrane 11 and is also heat-sealed to the membrane 11.

As an alternative, the draining layer 15 can be bonded, by means of an appropriate and strong adhesive (selected for example from heat-reactive adhesives, two-part epoxy adhesives, bituminous adhesives or others that are capable of gripping the material), to the membrane 11.

The anchoring layer 15 is breathable and perforated and is made of plastic material, preferably a polypropylene fabric, or the like or other material suitable for the passage of water and vapor.

In particular, it comprises a perforated polypropylene spun material, or the like, which ensures the grip of the adhesives and allows anchoring to the support of the membrane. The spun material comprises a fabric made of polypropylene, or similar material that allows both bonding to the support and the flow of the humidity present in the support and the management of vapor pressures.

Figure 2:
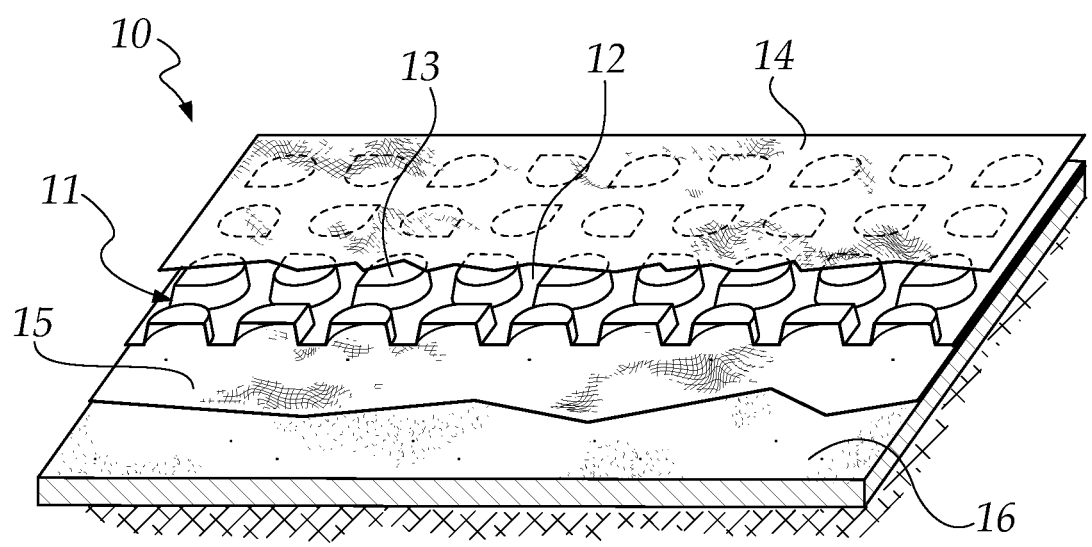
FIG. 2 is a sectional perspective view of the covering according to the disclosure in a first variation thereof.

In a first variation of the covering 10, shown in FIG. 2, the anchoring layer 15 is applied to the lower surface of the membrane 11 exclusively in contact with the base 12, thus creating hollow volumes below the studs 13 that allow the passage of humidity present in the support and the management of the vapor pressures. The same figure shows the components of the covering in cross-section in different positions, in order to show them in their superimposed arrangement. In the product, these have substantially the same extension.

Vapor may be generated between the membrane 11 and the anchoring layer 15 due to the presence of residual humidity in the underlay (which, if it moved toward the flooring, would cause efflorescence problems). However, the hollow space serves as a vapor outlet.

The same figure also shows a layer of adhesive, designated by 16, on which is applied the covering 10.

Figure 3:
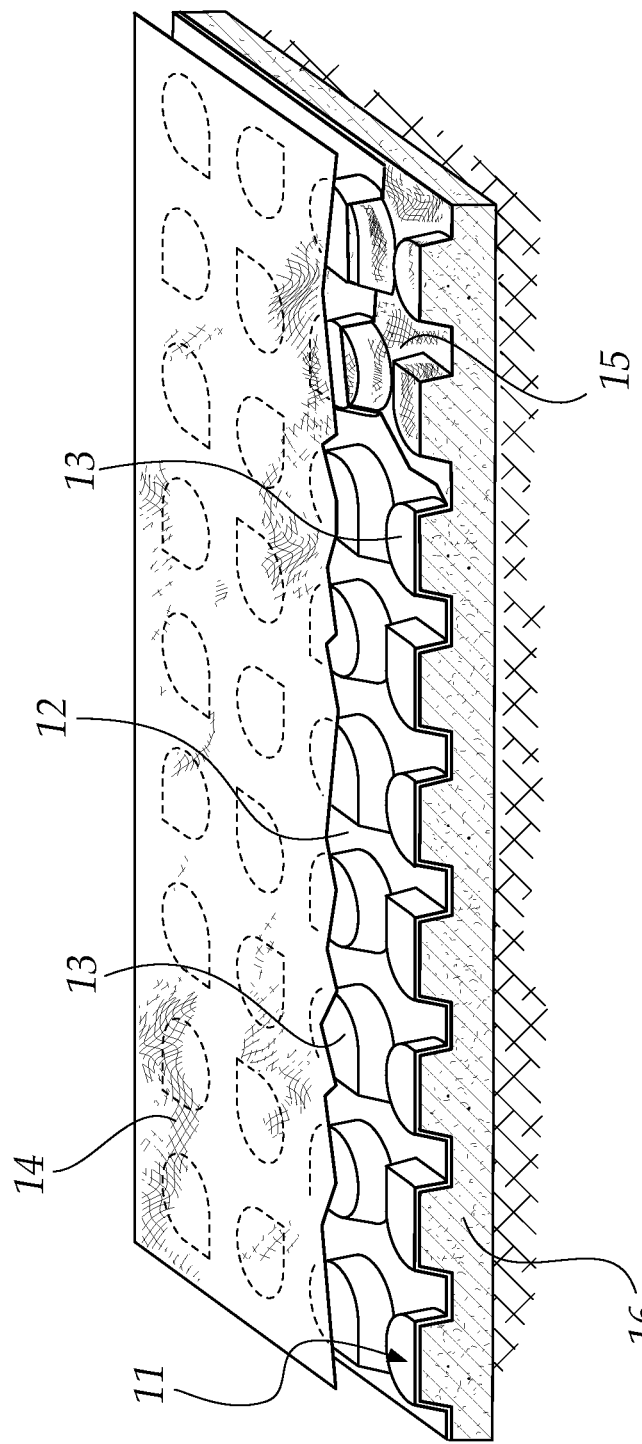
FIG. 3 is a sectional perspective view of the covering according to the disclosure in a second variation thereof.

In a second variation of the covering 10, shown in FIG. 3, the anchoring layer 15 is joined in a lower region to the membrane 11, covering substantially all of its lower surface. In this case, the anchoring layer 15 follows the shape of the membrane 11 and thus adheres to the cavities of the studs 13. In this case also, the figure shows the components of the covering in cross-section in different positions, in order to show them in their superimposed arrangement.

The space below the studs 13 is filled with the adhesive 16, preferably of the cement-based type, increasing the load-bearing capacity with respect to the previous version.

A connecting strip 17, preferably made of polyethylene, can be joined to the perimetric region of the membrane 11, below the anchoring layer 15, to allow the correct joining of two adjacent coverings 10 and prevent the passage of water, giving the system a waterproofing function. The junction of the two coverings 10 is shown in FIG. 4 and in FIG. 5, which also show the interposition of a polymeric sealing adhesive 18 used for the junction itself.

The strip 17 comprises preferably a flattened membrane made of polyethylene or the like, with two fabrics made of polyethylene or the like anchored on both sides which ensure the anchoring of the adhesive.

In particular, according to a first possible joining method, shown in FIG. 4, during laying the strip 17 is applied below the two coverings 10, at their sides that have to be adjacent, by means of the interposition of the sealant 18 between the strip 17 and said coverings.

As shown in FIG. 5, the strip 17 can be monolithic with the covering 10. It is partially heat-sealed to the lower face of the covering 10 and partially protrudes from it with a portion. In this case, joining occurs by gluing a second covering 10 to the protruding part of the strip 17, by means of the sealant 18.

In order to join two coverings 10 measuring 1 m² each it is preferable to use a strip with a width comprised between 20 mm and 500 mm.

The operation and use of the covering 10, according to the disclosure, are evident from what has been described and illustrated and in particular it is evident that the draining layer facilitates the passage of humidity to the underlying membrane: because of its particular shape, which substantially creates air pockets or chambers that allow humidity to reach the joints between the tiles; or perimetrically along the external edges of the flooring, allowing perfect curing and drying of the adhesive under the tiles.

In practice it has been found that the disclosure achieves the intended aim and advantages, providing a covering that is adapted to allow a perfect curing and drying of the adhesive present on the lower face of tiles, even large ones, avoiding the occurrence of unsightly drying defects.

The disclosure thus conceived is susceptible of numerous modifications and variations, all of which are within the scope of the appended claims; all the details may furthermore be replaced with other technically equivalent elements.

In practice, the materials used, so long as they are compatible with the specific use, as well as the contingent shapes and dimensions, may be any according to the requirements and the state of the art.

The disclosures in Italian Patent Application No. 102018000005884 from which this application claims priority are incorporated herein by reference.

The invention claimed is:

1. A covering for underlays of flooring comprising:
    a membrane with a base from which studs extend and protrude upward with respect to a laying plane,
    a draining layer which is joined in an upper region to said membrane at the top of said studs wherein said draining layer is heat-sealed to said membrane,
    an anchoring layer for anchoring to an underlay of the flooring, joined in a lower region to said membrane at least at said base, and
    a connecting strip, adapted for preventing the passage of water and joining adjacent coverings, is joined to a perimetric region of said membrane and below said anchoring layer, protrudes below said anchoring layer and is partially heat-sealed to a lower face of the covering,
    wherein the anchoring layer is a flat layer, wherein a sealant is a polymeric sealing adhesive and is interposed between the connecting strip and said anchoring layer, wherein the sealant is configured to glue a protruding portion of the connecting strip to the anchoring layer of an adjacent covering of said adjacent coverings.

2. The covering according to claim 1, wherein said studs are substantially frustum-shaped and have a reduction in cross-section away from said base.

3. The covering according to claim 1, wherein said membrane is made of plastic material.

4. The covering according to claim 1, wherein said draining layer is constituted by a geotextile material.

5. The covering according to claim 1, wherein said anchoring layer is constituted by polypropylene fabric.

6. The covering according to claim 1, wherein said anchoring layer is heat-sealed to said membrane.

7. The covering according to claim 1, wherein said anchoring layer is applied to a lower surface of said membrane exclusively in contact with said base.

8. The covering according to claim 7, wherein said anchoring layer is joined in a lower region" to "anchoring layer is joined in the lower region to said membrane, covering substantially all of the lower surface of said membrane.

9. The covering according to claim 1, wherein said anchoring layer is constituted by a polypropylene spun material and is heat-sealed to said membrane.

* * * * *